United States Patent
Maamoun et al.

(10) Patent No.: US 10,404,401 B1
(45) Date of Patent: Sep. 3, 2019

(54) FLEXIBLE GRID BULK SPECTRUM ASSIGNMENT SYSTEMS AND METHODS

(71) Applicant: Ciena Corporation, Hanover, MD (US)

(72) Inventors: Khaled Maamoun, Nepean (CA); Kai Wu, Johns Creek, GA (US)

(73) Assignee: Ciena Corporation, Hanover, MD (US)

(*) Notice: Subject to any disclaimer, the term of this patent is extended or adjusted under 35 U.S.C. 154(b) by 0 days.

(21) Appl. No.: 16/163,729

(22) Filed: Oct. 18, 2018

(51) Int. Cl.
*H04J 14/02* (2006.01)
*H04Q 11/00* (2006.01)

(52) U.S. Cl.
CPC ...... *H04J 14/0257* (2013.01); *H04J 14/0271* (2013.01); *H04Q 11/0062* (2013.01); *H04Q 2011/0081* (2013.01); *H04Q 2011/0086* (2013.01)

(58) Field of Classification Search
CPC .................................................. H04J 14/0227
See application file for complete search history.

(56) References Cited

U.S. PATENT DOCUMENTS

| | | | |
|---|---|---|---|
| 8,682,160 B2 | 3/2014 | Prakash et al. | |
| 9,686,599 B2 | 6/2017 | Maamoun | |
| 9,755,893 B2 | 9/2017 | Wang et al. | |
| 10,009,105 B2 | 6/2018 | Brueckheimer et al. | |
| 2014/0241717 A1 | 8/2014 | Cvijetic | |
| 2014/0334817 A1 | 11/2014 | Miedema | |
| 2015/0333824 A1 | 11/2015 | Swinkels et al. | |
| 2017/0134114 A1 | 5/2017 | Boertjes et al. | |
| 2017/0142505 A1* | 5/2017 | Maamoun | H04Q 11/0066 |
| 2018/0006757 A1* | 1/2018 | Prakash | H04B 10/27 |

OTHER PUBLICATIONS

ITU-T G.694.1, "Spectral grids for WDM applications: DWDM frequency grid," Feb. 2012.

* cited by examiner

*Primary Examiner* — Shi K Li
(74) *Attorney, Agent, or Firm* — Clements Bernard Walker PLLC; Christopher L. Bernard; Lawrence A. Baratta, Jr.

(57) ABSTRACT

Spectrum assignment systems and methods include, for an optical network with a plurality of links with optical spectrum on each of the plurality of links managed utilizing a flexible grid, obtaining a set of S services which require spectrum assignment on various links in the optical network; partitioning the set of S services into a plurality of groups G, wherein each group has one or more of the S services that are disjoint from one another based on occupancy of links, and wherein the plurality of groups G are selected based on fill which is a number of links occupied of the plurality of links, standard deviation, and width of spectrum; determining a sequence of the plurality of groups that minimizes useless spectrum, the useless spectrum being slots of spectrum unavailable for new channels; and assigning spectrum to the set of S services based on the determined sequence.

20 Claims, 15 Drawing Sheets

*FIG. 5*

Sets of 2 members

60

| | {1,2} | {1,4} | {1,6} | {1,7} | {1,9} | {2,4} | {2,6} | {2,7} | {2,8} | {3,5} | {3,7} | {4,5} | {4,7} | {4,10} | {5,6} | {5,7} | {6,7} | {6,10} | {7,8} | {7,9} | {8,10} |
|---|---|---|---|---|---|---|---|---|---|---|---|---|---|---|---|---|---|---|---|---|---|
| S1 | 0 | 0 | 0 | 0 | 0 | 0 | 0 | 0 | 0 | 0 | 0 | 0 | 0 | 0 | 0 | 0 | 0 | 0 | 0 | 0 | 0 |
| S2 | 0 | 0 | 0 | 0 | 0 | 0 | 0 | 0 | 0 | 0 | 0 | 0 | 0 | 0 | 0 | 0 | 0 | 0 | 0 | 0 | 0 |
| S3 | 0 | 0 | 0 | 0 | 0 | 0 | 0 | 0 | 0 | 0 | 0 | 0 | 0 | 0 | 0 | 0 | 0 | 0 | 0 | 0 | 0 |
| S4 | 1 | 0 | 0 | 0 | 0 | 0 | 0 | 0 | 0 | 0 | 0 | 0 | 0 | 0 | 0 | 0 | 0 | 0 | 0 | 0 | 0 |
| S5 | 0 | 0 | 0 | 0 | 0 | 0 | 0 | 0 | 0 | 0 | 0 | 0 | 0 | 0 | 0 | 0 | 0 | 0 | 0 | 0 | 0 |
| S6 | 1 | 0 | 0 | 0 | 0 | 0 | 0 | 0 | 0 | 0 | 0 | 0 | 0 | 0 | 0 | 0 | 0 | 0 | 0 | 0 | 0 |
| S7 | 1 | 1 | 1 | 0 | 0 | 1 | 1 | 0 | 0 | 1 | 0 | 1 | 0 | 0 | 1 | 0 | 0 | 0 | 0 | 0 | 0 |
| S8 | 0 | 0 | 0 | 0 | 0 | 0 | 0 | 1 | 0 | 0 | 0 | 0 | 0 | 0 | 0 | 0 | 0 | 0 | 0 | 0 | 0 |
| S9 | 0 | 0 | 0 | 1 | 0 | 0 | 0 | 0 | 0 | 0 | 0 | 0 | 0 | 0 | 0 | 0 | 0 | 0 | 0 | 0 | 0 |
| S10 | 0 | 0 | 0 | 0 | 0 | 0 | 0 | 0 | 0 | 0 | 0 | 0 | 0 | 0 | 0 | 0 | 0 | 0 | 0 | 0 | 0 |
| FILL | 5 | 4 | 4 | 4 | 5 | 3 | 3 | 3 | 4 | 5 | 4 | 3 | 2 | 4 | 3 | 3 | 2 | 4 | 3 | 3 | 5 |
| σ | 1.41 | 2.83 | 2.12 | 9.90 | 1.41 | 1.41 | 0.71 | 8.49 | 1.41 | 0.71 | 7.78 | 0.00 | 7.07 | 0.00 | 0.71 | 7.07 | 7.78 | 0.71 | 7.07 | 8.49 | 0.00 |
| Max W | 6 | 8 | 7 | 18 | 6 | 8 | 7 | 18 | 8 | 8 | 18 | 8 | 18 | 8 | 8 | 18 | 18 | 8 | 18 | 18 | 8 |

62

Sets of 3 member3

| | {1,2,4} | {1,2,6} | {1,2,7} | {1,4,7} | {1,6,7} | {2,4,7} | {2,6,7} | {3,5,7} | {4,5,7} | {5,6,7} | {2,7,8} | {1,7,9} |
|---|---|---|---|---|---|---|---|---|---|---|---|---|
| S1 | 0 | 0 | 0 | 0 | 0 | 0 | 0 | 0 | 0 | 0 | 0 | 0 |
| S2 | 0 | 0 | 0 | 0 | 0 | 0 | 0 | 0 | 0 | 0 | 0 | 0 |
| S3 | 0 | 0 | 0 | 0 | 0 | 0 | 0 | 0 | 0 | 0 | 0 | 0 |
| S4 | 0 | 0 | 0 | 0 | 0 | 0 | 0 | 0 | 0 | 0 | 0 | 0 |
| S5 | 0 | 0 | 0 | 0 | 0 | 0 | 0 | 0 | 0 | 0 | 0 | 0 |
| S6 | 0 | 0 | 0 | 0 | 0 | 0 | 0 | 0 | 0 | 0 | 0 | 0 |
| S7 | 1 | 1 | 0 | 0 | 0 | 0 | 0 | 0 | 0 | 0 | 0 | 0 |
| S8 | 0 | 0 | 0 | 0 | 0 | 0 | 0 | 0 | 0 | 0 | 0 | 0 |
| S9 | 0 | 0 | 0 | 0 | 0 | 0 | 0 | 0 | 0 | 0 | 0 | 0 |
| S10 | 0 | 0 | 0 | 0 | 0 | 0 | 0 | 0 | 0 | 0 | 0 | 0 |
| FILL | 6 | 6 | 6 | 5 | 5 | 4 | 4 | 6 | 4 | 4 | 5 | 6 |
| σ | 2.00 | 1.53 | 7.57 | 7.21 | 7.37 | 6.43 | 6.66 | 6.08 | 5.77 | 6.08 | 6.43 | 7.57 |
| Max W | 8 | 7 | 18 | 18 | 18 | 18 | 18 | 18 | 18 | 18 | 18 | 18 |

64

Sets of 4 members

| | {1,2,4,7} | {1,2,6,7} |
|---|---|---|
| S1 | 0 | 0 |
| S2 | 0 | 0 |
| S3 | 0 | 0 |
| S4 | 0 | 0 |
| S5 | 0 | 0 |
| S6 | 0 | 0 |
| S7 | 0 | 0 |
| S8 | 0 | 0 |
| S9 | 0 | 0 |
| S10 | 0 | 0 |
| FILL | 7 | 7 |
| σ | 6.22 | 6.29 |
| Max W | 18 | 18 |

|  | {1,2,4,7} | {1,2,6,7} |
|---|---|---|
| S1 | 0 | 0 |
| S2 | 0 | 0 |
| S3 | 0 | 0 |
| S4 | 0 | 0 |
| S5 | 0 | 0 |
| S6 | 0 | 0 |
| S7 | 0 | 0 |
| S8 | 0 | 0 |
| S9 | 0 | 0 |
| S10 | 0 | 0 |
| FILL | 7 | 7 |
| σ | 6.22 | 6.29 |
| Max W | 18 | 18 |

Set {1,2,4,7} is selected to form G1

|     | S3 | S5 | S6 | S8 | S9 | S10 | {3,5} | {5,6} | {6,10} | {8,10} |
|-----|----|----|----|----|----|-----|-------|-------|--------|--------|
| S1  | 0  | 0  | 1  | 0  | 1  | 0   | 0     | 0     | 0      | 0      |
| S2  | 0  | 0  | 1  | 1  | 0  | 0   | 0     | 0     | 0      | 0      |
| S3  | 0  | 1  | 0  | 0  | 0  | 0   | 0     | 0     | 0      | 0      |
| S4  | 0  | 1  | 0  | 0  | 0  | 1   | 0     | 0     | 0      | 0      |
| S5  | 1  | 0  | 1  | 0  | 0  | 0   | 0     | 0     | 0      | 0      |
| S6  | 0  | 1  | 0  | 0  | 0  | 1   | 0     | 0     | 0      | 0      |
| S7  | 1  | 1  | 1  | 1  | 0  | 1   | 0     | 0     | 0      | 0      |
| S8  | 0  | 0  | 0  | 0  | 0  | 1   | 0     | 0     | 0      | 0      |
| S9  | 0  | 0  | 0  | 0  | 0  | 0   | 0     | 0     | 0      | 0      |
| S10 | 0  | 0  | 1  | 1  | 0  | 0   | 0     | 0     | 0      | 0      |
| FILL | 3 | 2  | 1  | 2  | 2  | 3   | 5     | 3     | 4      | 5      |
| σ   |0.00|0.00|0.00|0.00|0.00|0.00 |0.71   |0.71   |0.71    |0.00    |
| Max W | 7 | 8 | 7  | 8  | 6  | 8   | 8     | 8     | 8      | 8      |

Set {3,5} is selected to form G2

T3

G2    {3,5}

|    |   |   |   |   |   |   |   |
|----|---|---|---|---|---|---|---|
| F1 | 3 | 3 | 3 | 3 | 3 | 3 | 3 |
| F2 | 5 | 5 | 5 | 5 | 5 | 5 | 5 |
| F3 |   |   |   |   |   |   |   |
| F4 | 3 | 3 | 3 | 3 | 3 | 3 | 3 |
| F5 |   |   |   |   |   |   |   |
| F6 | 3 | 3 | 3 | 3 | 3 | 3 | 3 |
| F7 | 5 | 5 | 5 | 5 | 5 | 5 | 5 |

| | S6 | S8 | S9 | S10 | {6,10} | {8,10} |
|---|---|---|---|---|---|---|
| S1 | 1 | 0 | 1 | 0 | 0 | 0 |
| S2 | 1 | 1 | 0 | 0 | 0 | 0 |
| S3 | 0 | 0 | 1 | 0 | 0 | 0 |
| S4 | 0 | 0 | 0 | 1 | 0 | 0 |
| S5 | 1 | 0 | 0 | 0 | 0 | 0 |
| S6 | 0 | 0 | 0 | 1 | 0 | 0 |
| S7 | 1 | 1 | 1 | 0 | 0 | 0 |
| S8 | 0 | 0 | 0 | 1 | 0 | 0 |
| S9 | 0 | 0 | 0 | 0 | 0 | 0 |
| S10 | 1 | 1 | 0 | 0 | 0 | 0 |
| FILL | 1 | 2 | 2 | 3 | 4 | 5 |
| σ | 0.00 | 0.00 | 0.00 | 0.00 | 0.71 | 0.00 |
| Max W | 7 | 8 | 6 | 8 | 8 | 8 |

Set {8,10} is selected to form G3

| | | | | | | | | |
|---|---|---|---|---|---|---|---|---|
| F1 | 10 | 10 | 10 | 10 | 10 | 10 | 10 | 10 |
| F2 | 10 | 10 | 10 | 10 | 10 | 10 | 10 | 10 |
| F3 | | | | | | | | |
| F4 | 8 | 8 | 8 | 8 | 8 | 8 | 8 | 8 |
| F5 | 10 | 10 | 10 | 10 | 10 | 10 | 10 | 10 |
| F6 | | | | | | | | |
| F7 | 8 | 8 | 8 | 8 | 8 | 8 | 8 | 8 |

| G1 | G2 | G3 | G4 | G5 |

*FIG. 12*

FLEXIBLE GRID BULK SPECTRUM ASSIGNMENT SYSTEMS AND METHODS

FIELD OF THE DISCLOSURE

The present disclosure generally relates to optical networking. More particularly, the present disclosure relates to flexible grid bulk spectrum assignment systems and methods.

BACKGROUND OF THE DISCLOSURE

Routing and Wavelength Assignment (RWA) is a well-known problem for fixed grid optical networks while Routing and Spectrum Assignment (RSA) is its equivalent term to the same problem for flexible grid optical networks. In fixed grid optical networks, wavelengths are spaced apart from each other according to a wavelength spectrum grid defined by International Telecommunication Union (ITU) in ITU-T G.694.1 (02/12), "Spectral grids for WDM applications: DWDM frequency grid," the contents of which are incorporated by reference. In flexible grid optical networks, which is also described in ITU Recommendation G.694.1 "Spectral grids for WDM applications: DWDM frequency grid" (02/12), each signal can be allocated to spectrum with different spectral widths optimized for the bandwidth requirements of the particular bit rate and modulation scheme of the individual channels. The ultimate objective of RWA or RSA is to find a wavelength or spectrum assignment on a route for a particular channel in the optical network, such assignment and routing being optimal in some manner.

The conventional implementation for Spectrum Assignment (SA) techniques utilizes a sequential processor which handles requests one at a time. This approach attempts to optimize the current spectrum planning foreach new request which attempts to achieve a local optimization. However, a current request can block network resources for subsequent requests, i.e., the sequence of requests that is provided to an SA engine has a significant impact on the final resultant spectrum plan. As there can be almost an infinite number of request sequence orders as an input, SA planning results vary significantly.

There are some crude heuristics for sorting the (demand) list of requests before assigning them sequentially. For example, a "Longest first" selection criteria is commonly used which is believed to lead to better spectrum assignment than random ordering. In this approach, the ordering of the (demands) requests is done based on the network resources that they will consume, e.g., on the number of hops they traverse. The original problem is $O(N^N)$ and classified as Discrete Optimization (DOP) of Binary Integer Linear Programming (BILP). A branch and bound technique is the only systematic solution for these types of problems.

The problems with the ILP approach for SA include processing time and scalability. For processing time, conventional approaches with ILP can vary from hours to days depending on the network topology or specifically on the number of Optical Multiplex Sections (OMS) or fibers and the number of service demands. For scalability, the processing time does not have a linear relationship with either the number of OMS sections or the number of service demands; rather the relationship is typically exponential. The conventional SA techniques that use a sequential approach and develop a methodology for sorting the demand services in an ordered list based on some certain criteria suffer from flexibility issues as the rules which govern this sorting process vary with the change of network topology, type of the service demands and the number of service demands. A branch and bound technique suffers from computational complexity in terms of running time and memory size required. The nature of SA is a Non-deterministic Polynomial-Time (NP)-hard problem, and a globally optimal solution is not achievable. Accordingly, heuristic approaches are better suited for SA.

BRIEF SUMMARY OF THE DISCLOSURE

In an embodiment, a spectrum assignment method includes, for an optical network including a plurality of links with optical spectrum on each of the plurality of links managed utilizing a flexible grid, obtaining a set of S services which require spectrum assignment on various links in the optical network; partitioning the set of S services into a plurality of groups G, wherein each group includes one or more of the S services that are disjoint from one another based on occupancy of links of the plurality of links, and wherein the plurality of groups G are selected based on fill which is a number of links occupied of the plurality of links, standard deviation, and width of spectrum; determining a sequence of the plurality of groups that minimizes useless spectrum, the useless spectrum being slots of spectrum unavailable for new channels; and assigning spectrum to the set of S services based on the plurality of groups and the determined sequence. The flexible grid can include a plurality of slots each having a specified spacing. The sequence of the plurality of groups that minimizes useless spectrum has a least number of slots unavailable for new channels as the plurality of groups are slid into one another. The plurality of groups G can be selected such that a first group has a largest fill and smallest standard deviation and each subsequent group is similarly selected until all of the set of S services are in one of the plurality of groups G. The partitioning the set of S services into the plurality of groups G can utilize a matrix M which illustrates whether a particular service or group is disjoint with another particular service or group. The sequence has two groups slid into one another such that a total group width is less than a combination of widths of the two groups. The useless spectrum are slots that are blocked based on the sliding of the two groups.

In another embodiment, a processing device includes a network interface and a processor communicatively coupled to one another; and memory storing instructions that, when executed, cause the processor to, for an optical network including a plurality of links with optical spectrum on each of the plurality of links managed utilizing a flexible grid, obtain, via the network interface, a set of S services which require spectrum assignment on various links in the optical network, partition the set of S services into a plurality of groups G, wherein each group includes one or more of the S services that are disjoint from one another based on occupancy of links of the plurality of links, and wherein the plurality of groups G are selected based on fill which is a number of links occupied of the plurality of links, standard deviation, and width of spectrum, determine a sequence of the plurality of groups that minimizes useless spectrum, the useless spectrum being slots of spectrum unavailable for new channels, and assign spectrum to the set of S services based on the plurality of groups and the determined sequence. The flexible grid can include a plurality of slots each having a specified spacing. The sequence of the plurality of groups that minimizes useless spectrum has a least number of slots unavailable for new channels as the plurality of groups are slid into one another. The plurality of groups G can be selected such that a first group has a largest fill and smallest standard deviation and each subsequent group is similarly selected until all of the set of S services are in one of the plurality of groups G. The partitioning the set of S services into the plurality of groups G can utilize a matrix M which illustrates whether a particular service or group is disjoint with another particular service or group. The sequence can have two groups slid into one another such that a total group width is less than a combination of widths of the two groups. The useless spectrum are slots that are blocked based on the sliding of the two groups.

In a further embodiment, a non-transitory computer-readable medium including instructions that, when executed, cause a processing device to perform the steps of, for an optical network including a plurality of links with optical spectrum on each of the plurality of links managed utilizing a flexible grid, obtaining a set of S services which require spectrum assignment on various links in the optical network; partitioning the set of S services into a plurality of groups G, wherein each group includes one or more of the S services that are disjoint from one another based on occupancy of links of the plurality of links, and wherein the plurality of groups G are selected based on fill which is a number of links occupied of the plurality of links, standard deviation, and width of spectrum; determining a sequence of the plurality of groups that minimizes useless spectrum, the useless spectrum being slots of spectrum unavailable for new channels; and assigning spectrum to the set of S services based on the plurality of groups and the determined sequence. The flexible grid can include a plurality of slots each having a specified spacing. The sequence of the plurality of groups that minimizes useless spectrum can have a least number of slots unavailable for new channels as the plurality of groups are slid into one another. The plurality of groups G can be selected such that a first group has a largest fill and smallest standard deviation and each subsequent group is similarly selected until all of the set of S services are in one of the plurality of groups G. The partitioning the set of S services into the plurality of groups G can utilize a matrix M which illustrates whether a particular service or group is disjoint with another particular service or group. The sequence can have two groups slid into one another such that a total group width is less than a combination of widths of the two groups.

BRIEF DESCRIPTION OF THE DRAWINGS

The present disclosure is illustrated and described herein with reference to the various drawings, in which like reference numbers are used to denote like system components/method steps, as appropriate, and in which:

FIG. 5 are tables of various services (labeled as S1-S10) and the spectrum used on different links in the optical network;

FIG. 7 is the expanded table of the matrix M in FIG. 6 with the group G1 selected;

FIGS. 8A and 8B are the shrunk table of the matrix M with the service members of group G1 formed in FIG. 7 are removed from any sets and group G2 is selected;

FIGS. 10A and 10B are the shrunk table of the matrix M with the service members of group G1, G2, G3 formed in FIGS. 7, 8, 9 are removed from any sets and groups G4, G5 are selected;

FIG. 12 is a table of a typical unprocessed group placement;

DETAILED DESCRIPTION OF THE DISCLOSURE

In various embodiments, the present disclosure relates to flexible grid bulk spectrum assignment systems and methods. Specifically, the spectrum assignment systems and methods provide a heuristic which reduces the complexity of the computation. The heuristic is a shortcut to the optimal solution which is close to optimal, but which requires significantly less computational resources (time, processing, memory). The spectrum assignment systems and methods provide an approach for bulk assignments of services (e.g., Subnetwork Connections (SNCs) in a flexible grid optical network. The bulk assignments can be in a greenfield scenario (new network) where multiple initial services are needed or in a brownfield scenario (some services deployed) where multiple subsequent services are needed. This disclosure relates to greenfield deployments as well as unassigned spectrum area in the brownfield deployments.

The spectrum assignment systems and methods replace conventional ILP solutions and provide a near-optimal solution in a fairly short time measured in minutes compared to hours or days of traditional ILP solutions (if it exists). The spectrum assignment systems and methods generally have two sets of steps—partitioning and sequencing (pairing/grouping). The partitioning includes providing partition candidates from a conflict map (spectrum map) and selecting and choosing disjoint groups until all services are assigned. The partition itself maximizes the gain from sharing spectrum index (when conflict-free). The pairing/grouping is performed to reduce the widest Media Channel (MC) spectrum in any link. For example, two pieces paired together are treated as a single piece. The pairing/grouping is ordered/guided by various rules described herein.

The spectrum assignment systems and methods can also perform routing selection in addition to spectrum assignment. By generating the shortest-viable-k routes and create avatar spectrum patterns for them; $SNC_1^1$, $SNC_1^2$, $SNC_1^3$, . . . $SNC_1^k$. In group forming, only one avatar is allowed among the group members. As soon as a group is formed with an avatar, all its mates will be deleted from M-matrix sets.

Optical Network

Figure 1:
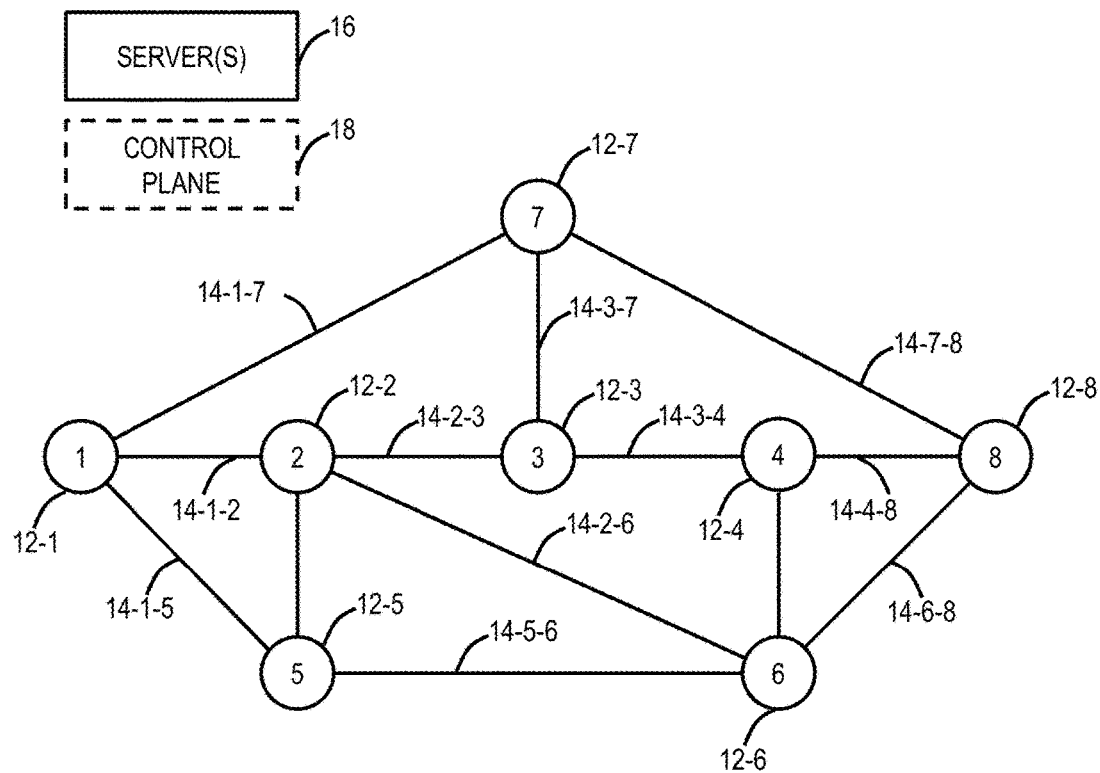
FIG. 1 is a network diagram of an example optical network.

FIG. 1 is a network diagram of an example optical network 10. The optical network 10 includes nodes 12, labeled as nodes 12-1-12-8, interconnected to one another via links 14 which physically can include one or more optical fibers. Each link is an OMS section. The nodes 12 can also be referred to as network elements and can include, without limitation, Wavelength Division Multiplex (WDM) terminals, Dense WDM (DWDM) terminals, Optical Add/Drop Multiplexers (OADMs), Reconfigurable OADMs (ROADMs), optical cross-connects, optical switches, Packet-Optical Transport Systems (POTS), and the like. In various embodiments, the nodes 12 include various hardware and software to communicate with one another via wavelengths, timeslots, packets, etc. At a physical layer, the nodes 12 provide one or more wavelengths between one another over the links 14. Note, while FIG. 1 shows a single node 12 at each location, there can be multiple devices or network elements providing multiple wavelengths.

For illustration purposes, each of the links 14 is labeled as link 14-X-Y where X and Y are the nodes interconnected by the links 14. The links 14 can utilize spectrum governed by ITU-T G.694.1 (02/12) for both fixed and flexible. The spectrum assignment systems and methods assume a flexible grid spectrum. The objective of the spectrum assignment systems and methods is to assign spectrum optimally across the links 14 in a manner that minimizes chances of blocking in the optical network 10. Blocking means that a particular spectrum is unavailable on one or more links 14, preventing a connection. Stated different, the spectrum assignment systems and methods answer the question of which spectrum should be assigned to a particular A-Z connection (SNC) in the optical network 10 in a manner that minimizes the chance of blocking.

The optical network 10 can also include one or more servers 16 and/or a control plane 18. The servers 16 can include or operate as, for example, a Software Defined Networking (SDN) controller, an SDN application, a Network Management System (NMS), an Element Management System (EMS), a planning tool, a Path Computation Element (PCE), etc. The control plane 18 provides an automatic allocation of network resources in an end-to-end manner. Example control planes may include Automatically Switched Optical Network (ASON) as defined in ITU-T G.8080/Y.1304, Architecture for the automatically switched optical network (ASON) (02/2012), the contents of which are herein incorporated by reference; Generalized Multi-Protocol Label Switching (GMPLS) Architecture as defined in IETF Request for Comments (RFC): 3945 (10/2004) and the like, the contents of which are herein incorporated by reference; Optical Signaling and Routing Protocol (OSRP) from Ciena Corporation which is an optical signaling and routing protocol similar to PNNI (Private Network-to-Network Interface) and MPLS; or any other type control plane for controlling network elements at multiple layers, and establishing connections. That is, the control plane 18 is configured to establish end-to-end signaled connections to route the connections and program the underlying hardware accordingly. SDN provides the management of network services through abstraction of lower-level functionality. This is done by decoupling the system that makes decisions about where traffic is sent (the control plane) from the underlying systems that forward traffic to the selected destination (the data plane). In various embodiments, the spectrum assignment systems and methods can be implemented through the nodes 12, the servers 16, and/or the control plane 18.

Flexible Grid Spectrum

Figure 2:
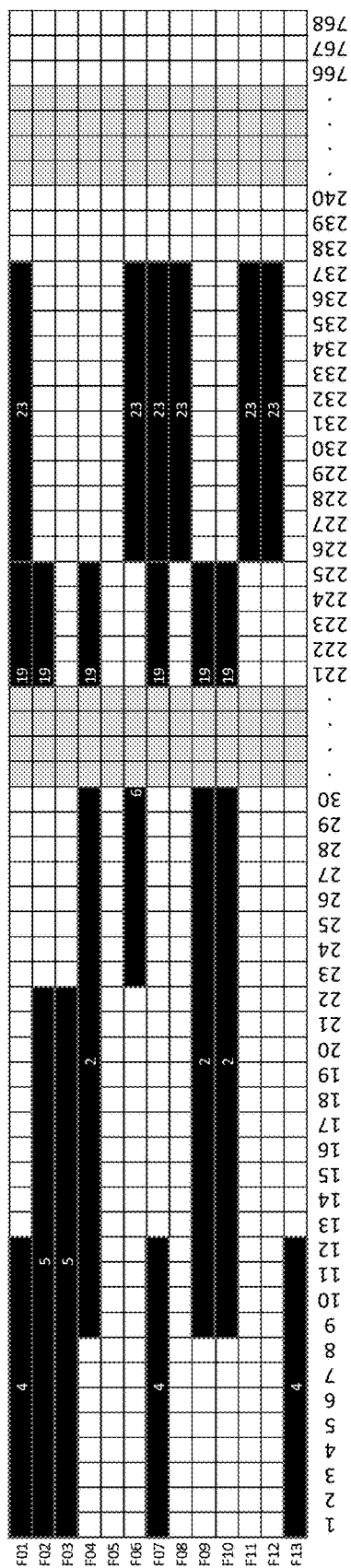
FIG. 2 is a table of a representation of optical spectrum in the optical network.

FIG. 2 is a table of a representation of optical spectrum 30 in the optical network 10. For management purposes, the optical spectrum 30 can be broken into 768 spectrum slots of 6.25 GHz each. For example, ITU-T G.694.1 defines the flexible grid as follows:

the allowed frequency slots have a nominal central frequency (in THz) defined by:
  193.1+n×0.00625 where n is a positive or negative integer including 0 and 0.00625 is the nominal central frequency granularity in THz and a slot width defined by:
  12.5×m where m is a positive integer and 12.5 is the slot width granularity in GHz.

The standard puts restrictions on the central frequency resolution and the spectrum granularity which violates the flexibility goals of this new technology. That explains why there are no updates since 2012.

Figure 3:
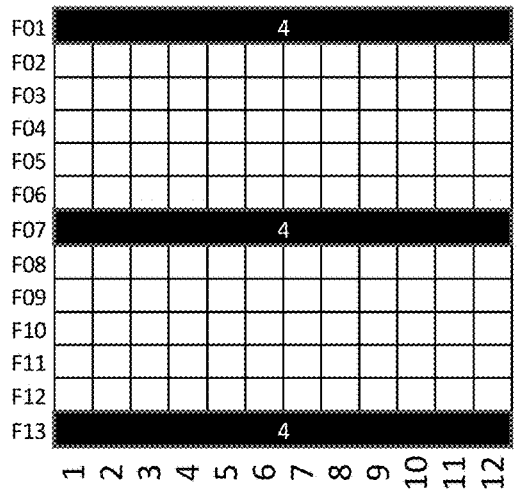
FIG. 3 is tables of the optical spectrum used by individual services.
Figure 3:
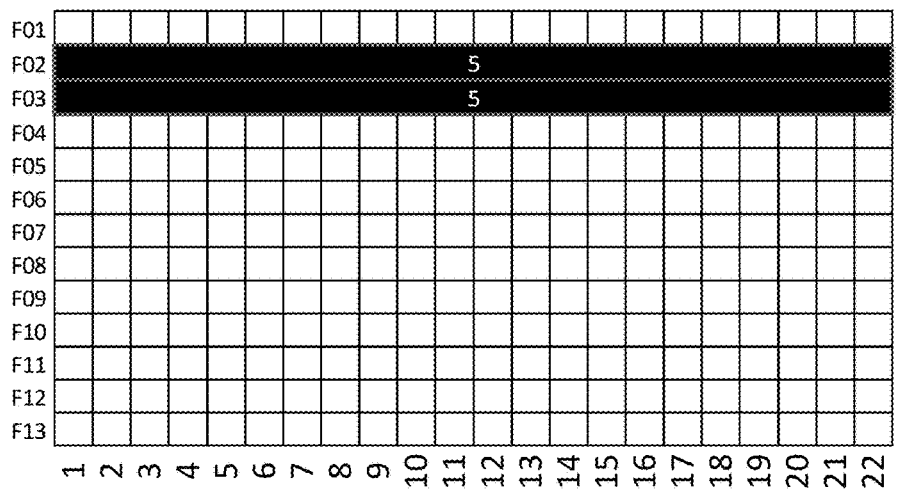
Figure 3:
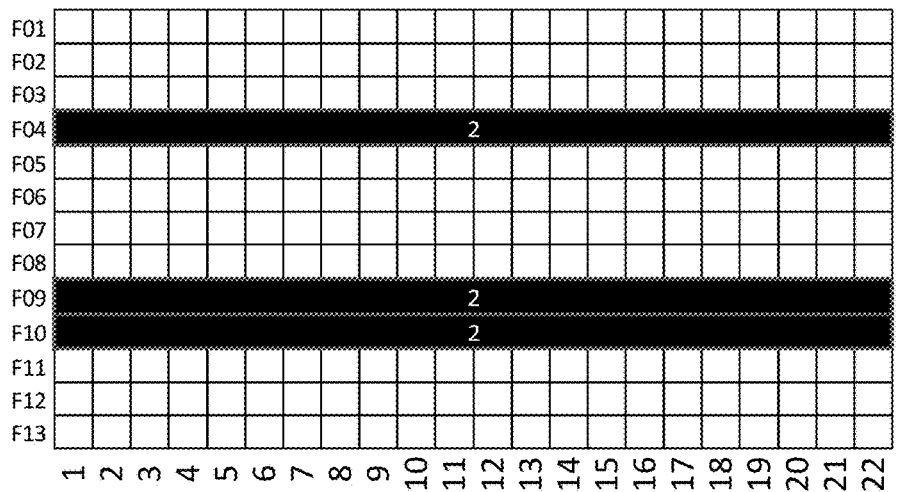

In the table of the optical spectrum 30 in FIG. 2, the vertical axis represents the network ROADM-to-ROADM links (or optical domains, OMS sections, links 14, etc.), while the horizontal axis represents the 768 spectrum slots of 6.25 GHz each. Any service is demonstrated as pixels that intersect vertically with its used spectrum slots and horizontally with its traversed links. Those pixels numbered by its service ID. FIG. 3 illustrates tables of the optical spectrum 30 used by individual services 2, 4, 5. For example, a service 2 uses 22 slots; 9-30 on links F04, F09, F10, a service 4 uses 12 slots; 1-12 on links F01, F07, F13, a service 5 uses 22 slots 1-22 on link F02, F03, etc. Of note, the table of FIG. 2 includes a break between slots 30 and 221 and between slots 240 and 766 for illustration purposes.

For terminology, a service is referred to as an SNC, and the SNC uses a Network Media Channel (NMC) to transfer data from a given source node to destination node. An SNC Group (SNCG) is a group of services that traverse the links 14 together in the optical network 10 in a single Media Channel (MC), i.e., the MC has the same source node and destination node and the MC is assigned to a contiguous spectrum space that is the same in all its traversed fiber sections. A batch of SNCs includes multiple services that traverse from the same source node to the same destination node while a bulk of SNCs includes multiple services that traverse from different source nodes to different destination nodes.

When the spectrum assignment processes a bulk of SNC requests, providing that the paths (the routes) are given for these services, these demands may be one or a combination of batches and independent SNCs. The batch(es) of SNCs need(s) to be assigned contiguously in one or more MCs. The SA task is to find the spectrum space(s) that takes the created MC(s) width(s). There are many factors that allow/restrict the spectrum assignment split of the SNCs' batch such as user planning preferences, contiguous spectrum space availability, hardware constraints (e.g., the number of available multiplexer ports), SNCs' signal latency requirement, etc. Independent SNC requests have different source and destination nodes. An SNC or service requires an amount of spectrum based on modulation format, baud rate, etc. For example, four slots at 6.25 GHz provide 25 GHz of spectrum, etc.

ILP Technique

The SA problem can be formulated as an ILP problem. This type of problem focuses on optimizing a single objective. The systematic problem formulation of the spectrum assignment for a bulk of SNC service request R that has each individual SNC in the form r(s, d, W), where (s, d) is the source-destination pair of nodes and W is the spectrum width required, is as follows:

Input parameters:
V: the set of nodes in the network.
E: the total links in the network.
(k,l): the link between node k and node l (k,l∈V,(k,l)∈E).
R: the set of a group of SNC requests.
GB: the spectrum separation between NMCs to avoid uncontrolled interference between them
DB: the padding spectrum at both MC sides to avoid the roll-off filter penalty of a Wavelength Selective Switch (WSS) port.
Constants include the spectrum slot width is 6.25 GHz, and the maximum number "f" of spectrum slots on a link is 768.
Variables include:
$B1_{k,l}^{r,f}$: is a binary variable that takes a value of 1 if the routing path of request r uses spectrum slot f on link (k,l) and 0 otherwise.
$B2_{k,l}^{r,f}$: is a binary variable that takes a value of 1 if request r is routed on link (k,l) and 0 otherwise.
$LSU_{k,l}$: the total spectrum usage on link (k,l).
NSU: the total spectrum usage in the network.
An objective function can be set to minimize NSU.
The required number of 6.25 GHz spectrum slots:

$$N^r = \lceil (W+GB+DB)/6.25 \rceil$$

The request Spectrum Usage $SU^r$ is the total number of 6.25 GHz spectrum slots used along the routing path.

$$SU^r = N^r * H^r$$

where $H^r$ is the number of hops of the routing path for request r.
The total spectrum occupancy of the link (k,l) is denoted as follows:

$$LSU_{k,l} = \sum^{r,f} B1_{k,l}^{r,f} \quad \forall (k,l)$$

The total spectrum occupancy of the network is denoted as follows:

$$NSU = \sum_{k,l}^{r,f} B1_{k,l}^{r,f}$$

The relationship between the binary variables $B1_{k,l}^{r,f}$ and $B2_{k,l}^{r,f}$ is:

$$\sum^f B1_{k,l}^{r,f}/N^r \leq B2_{k,l}^{r,f} \leq \sum^f B1_{k,l}^{r,f} \quad \forall (k,l)$$

Flow continuity constraints include:

$$\sum_x^f B1_{x,y}^{r,f} - \sum_y^f B1_{x,y}^{r,f} = 0 \quad \forall r, x \notin \{S, D\}, y \notin \{S, D\}$$

$$\sum_x^f B1_{S,x}^{r,f} - \sum_x^f B1_{x,S}^{r,f} \geq N^r \quad \forall (k,l), r, x \notin \{S, D\}$$

$$\sum_x^f B1_{x,D}^{r,f} - \sum_x^f B1_{D,x}^{r,f} \geq N^r \quad \forall (k,l), r, x \notin \{S, D\}$$

A single route constraint includes:

$$\sum_{k,l} B2_{k,l}^r = 1 \quad \forall r$$

A spectrum overlap constraint includes:

$$\sum_{k,l} B1_{k,l}^{r,f} \leq 1 \quad \forall r, f$$

Contiguity constraints include $$\sum^{f'} B1_{k,l}^{r,f'} \leq (B1_{k,l}^{r,f} + B1_{k,l}^{r,f+1}) * N^r \quad \forall (k,l), r, f' \notin [f+1, 768]$$

Again, the nature of SA is an NP-hard problem as the global optimum is not achievable in polynomial time due to a computers' memory limitation. Hence, heuristic approaches are well suited for this class of problems.

SA Heuristic

Figure 4:
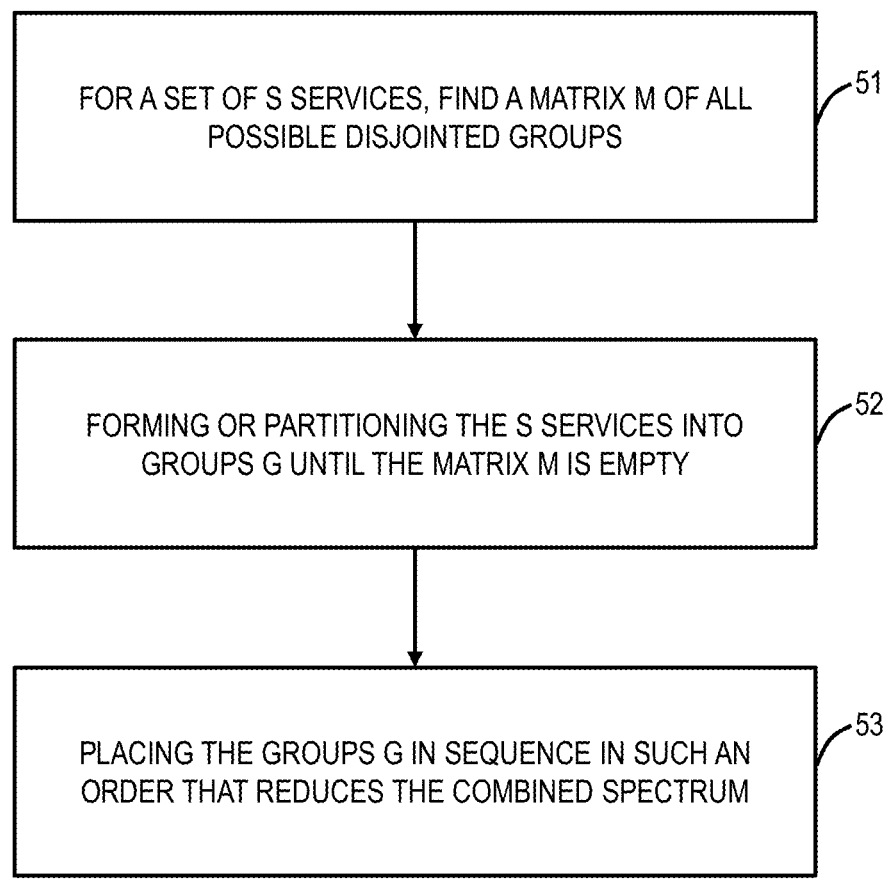
FIG. 4 is a flowchart of a spectrum assignment process.

FIG. 4 is a flowchart of a spectrum assignment process 50. The spectrum assignment process 50 is the result of a pattern analysis performed on ILP optimal solution results to develop a simple procedure to follow to get a result as close as possible with a minimal optimality gap. This is achieved by trading optimality, completeness, accuracy, or precision for speed. The spectrum assignment process 50 is performed for a set of S services to provide spectrum assignment, S is an integer. First, the spectrum assignment process 50 includes finding a matrix M of all possible disjointed groups of the set of S services (step 51). Matrix M contains metrics for S groups; "Fill", which is the number of fiber domains or links that the service group members traverse, "σ", the standard deviation (or the square root of the variance) of the service group members' spectrum width in terms of number of 6.25 GHz pixels, "Max W", the maximum spectrum width of the service group members. Second, the spectrum assignment process 50 includes forming or partitioning the set of S services into groups G until the matrix M is empty (step 52). Third, the spectrum assignment process 50 includes placing the groups G in sequence in such an order that reduces the combined spectrum (step 53).

The spectrum assignment process 50 can be implemented as follows:
FOR All SNCs in the set "S"
Find the set "M" of all possible disjointed groups.
ENDFOR
LOOP until "M" set is empty
Find set/s "A" with the highest clique (Fill value)
IF A has more than one member
   Find the set that has the smallest σ and then largest member width. Assign it as Gx.
ENDIF
Remove any "S" members that are in "G" groups from "M" sets.
ENDLOOP
Transfer the "G" member (G1) from "G" to combination set "C".

LOOP until all members in "G" are selected
Create group "P" that its members are the combination of "C" and each member of "G" from both right and left direction.
Find the "P" member/s "D" that has the largest combined width reduction.
IF D has more than one member
   Find the member "d" of "D" that gives the smallest "US" value
ENDIF
Append "d" to "C"
Remove any "G" members that are in "C".
ENDLOOP Set "S" includes services (SNCs) which require spectrum assignment. The services can be a batch of SNCs, a bulk of SNCs, or a combination thereof. An example of the set "S" is in FIG. 5.

Set "M" can be a matrix which shows all possible disjointed groups of the set "S." As described herein, the matrix "M" can have rows and columns which show a service or a group, and the cells indicate whether two services or groups are disjoint from one another, e.g., 1 means disjoint and 0 means overlap. By definition, two services are disjoint if they do not share any links 14 in the optical network 10, meaning the two services can be grouped together for purposes of spectrum assignment. That is, since the two services do not share any links 14, they can have the same spectrum. An example of the Set "M" is in FIG. 6.

Clique member/s "A" are members of the Set "M" and the objective is to form groups "G" using the clique member/s "A." As services in "S" are added to groups "G," they are removed from "M." The objective is to maximize the disjoint members in each group. A group G is formed by having two or more disjoint services S, and each group can have 2 or more members. The groups G can also be represented in the matrix "M." Examples of group formation are in FIGS. 7-11.

A first group G1 can be formed which has the most services S, the largest fill, and the smallest deviation, σ. As groups are formed, the associated members in the group are removed from the matrix "M." Finally, all the services S are placed in groups G1, G2, . . . Gn. Each group includes one or more services S which require spectrum assignment. For groups with multiple services, the multiple services are disjoint meaning they do not share common links 14 and thus can share the same spectrum.

Figure 12:
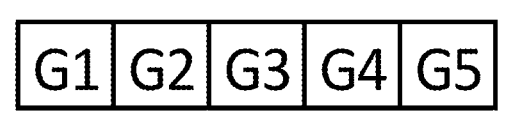
Figure 13:
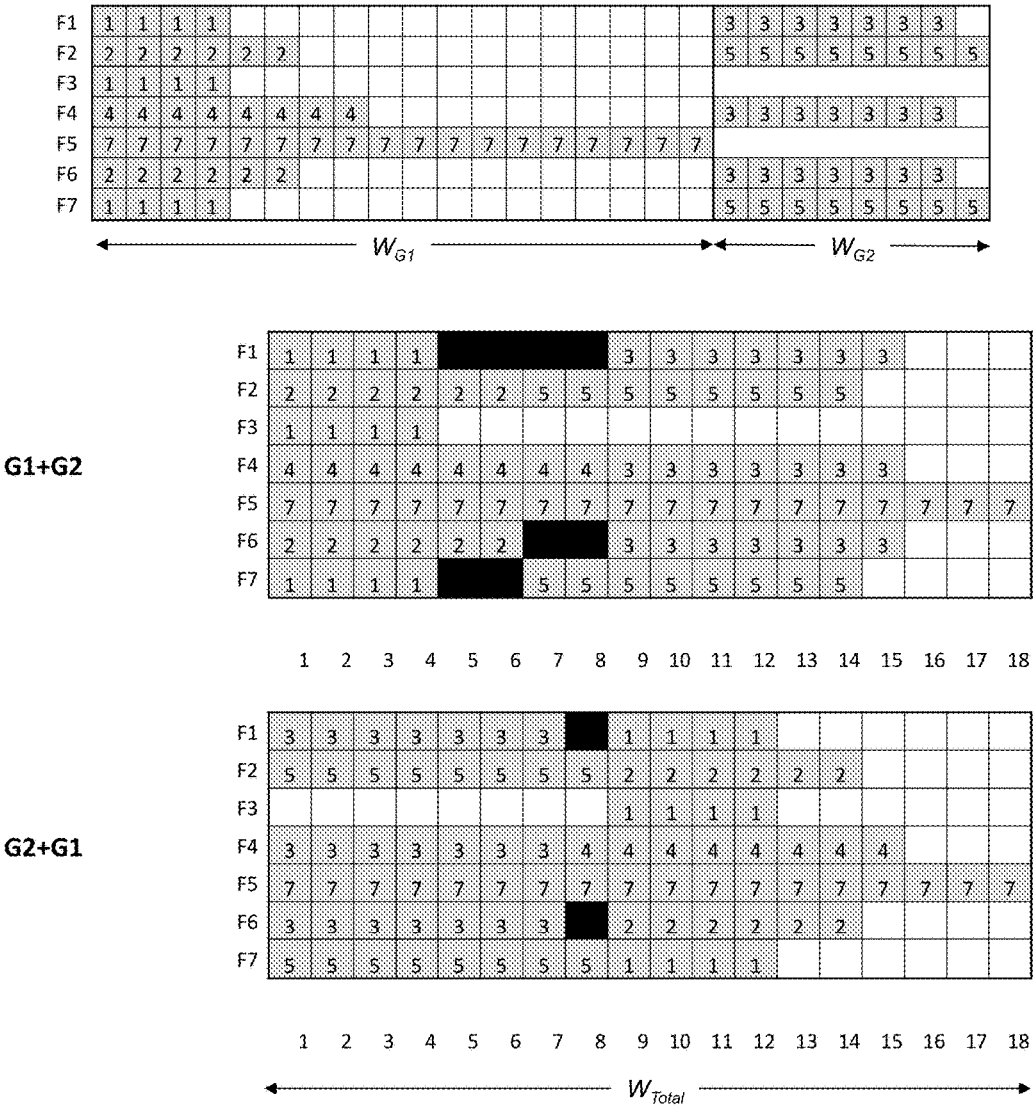
FIG. 13 is tables of two options for combining the groups G1, G2.

With the formed groups G1, G2, . . . Gn, a sequence must be determined that has the minimum waste or "useless" spectrum. Examples of group combination are shown in FIGS. 12-13.

Figure 14:
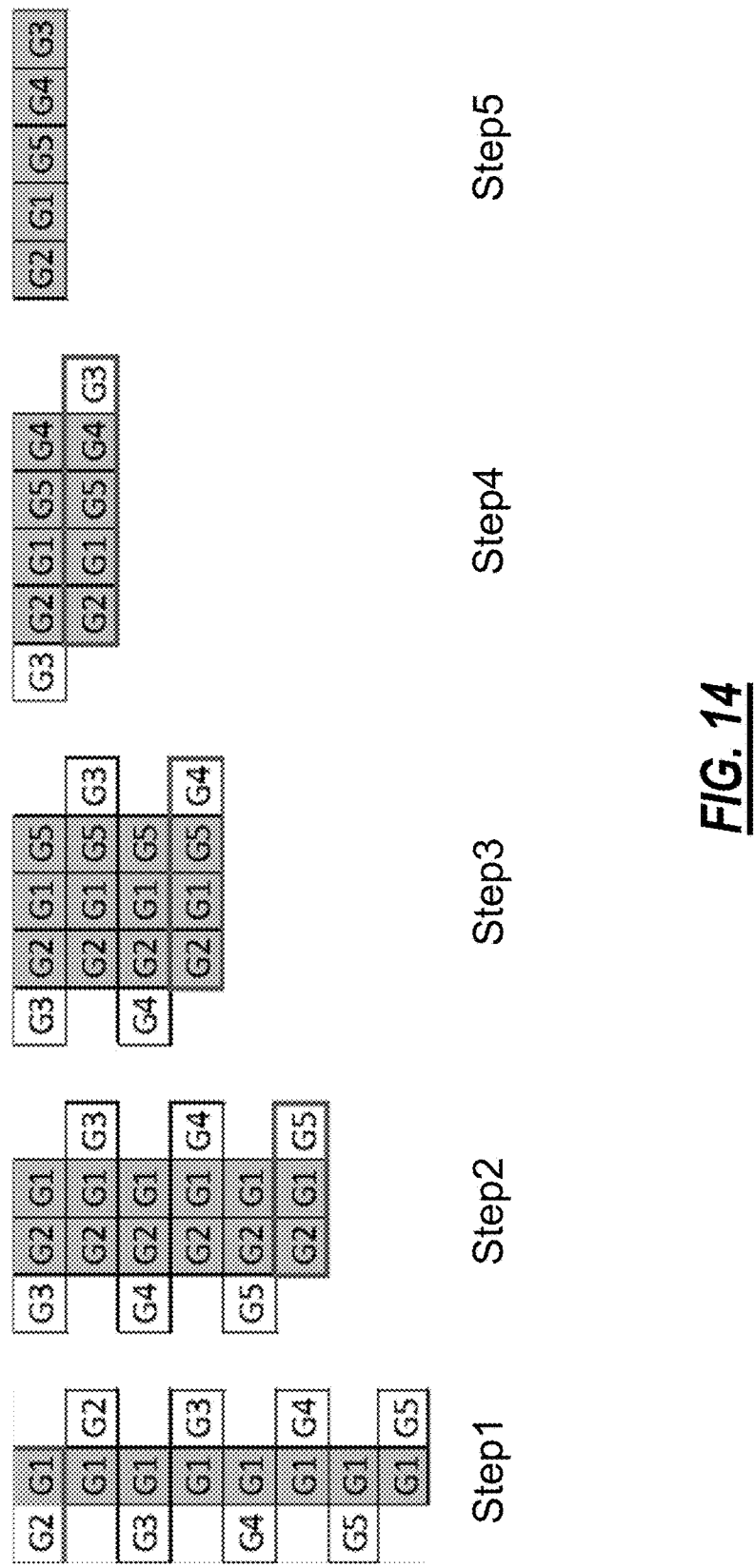
FIG. 14 is a diagram of group placement.

Combination set C is a sequence of the groups and the objective is to order the groups in C to minimize the "useless" spectrum. Groups P are various combinations of C and each member of G from both the right and left direction. An example of group sequencing is shown in FIG. 14.

Again, this approach is a simplified heuristic that models the optimum results from ILP which could take days to obtain whereas the spectrum assignment process 50 can take a few minutes at most. In an example implementation, ILP was used on a model network, and it did not converge even after three days of simulation whereas the spectrum assignment process 50 provides a solution in about four minutes. A nationwide optical network was modeled, and the spectrum assignment process 50 yielded a solution in about 17 minutes. In various experiments, it was determined that the spectrum assignment process 50 yields a solution which is between about 93% to 96% of an optimal solution but with orders of magnitude improvement in time, processing resources, etc.

Example of the Spectrum Assignment Process

The following describes an operation of the spectrum assignment process 50 with a set S of 10 SNCs. Of course, this is a small network with a small number of services, but this is for illustration convenience. Again, the spectrum assignment process 50 contemplates a large network along with a large number of services and the processing time generally scales linearly versus exponential with conventional ILP approaches.

FIGS. 5-14 illustrate various tables where each service can be conceptualized as one or more cells in the table with the number of cells representing the used spectrum. Thus, each service can be viewed conceptually as a rectangle and multiple services as multiple rectangles of varying lengths. The spectrum assignment process 50 provides an approach of how best to fit the multiple rectangles together to minimum waste or "useless" spectrum. In the tables, the rows represent different links in an optical network and the assumption is each service has to occupy the same cells (spectrum) on each link it traverses (assuming no wavelength conversion such as via a regenerator). The horizontal axis is unlabeled in each table and it represents spectrum. The spectrum assignment process 50 determines how to "fit" services together and once fit together, the spectrum can be assigned. For example, the start of the horizontal axis may be the beginning of the C-band (about 1530 nm) or any other point of optical spectrum.

Figure 5:
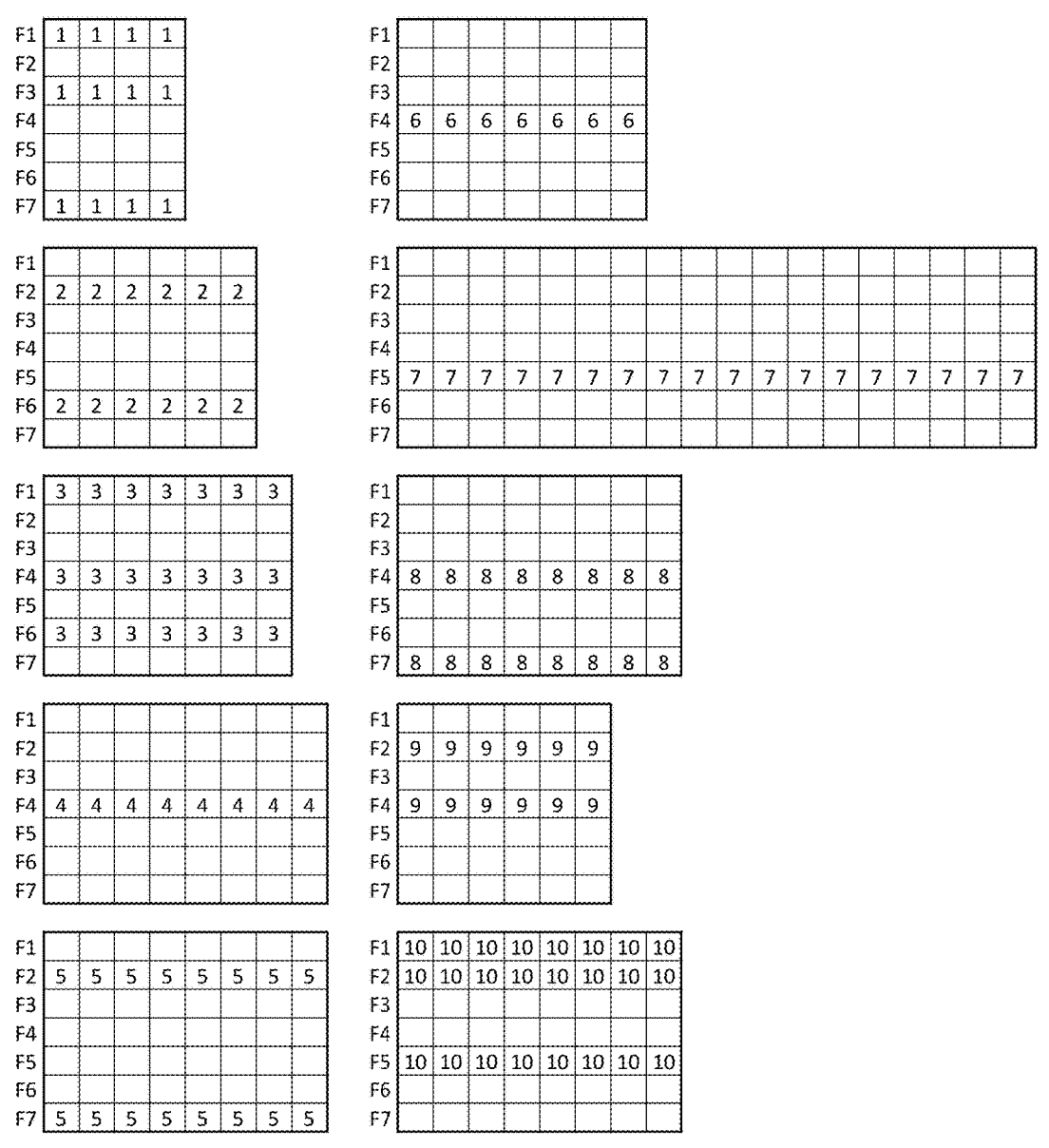

FIG. 5 illustrates tables of various services (labeled as 1-10 and referred to herein as S1-S10) and the spectrum 30 used on different links 14 in the optical network 10. For example, the optical network 10 in this example has links F1-F7. The service S1 requires 4 spectrum slots and utilizes the links F1, F3, F7. For purposes herein the sequence in which links F1, F3, F7 are traversed is immaterial, this is a distinction over some conventional ILPs. The service S2 requires 6 spectrum slots and utilizes the links F2, F6, the service S3 requires 7 spectrum slots and utilizes the links F1, F4, F6, the service S4 requires 8 slots and utilizes the link F4, the service S5 requires 8 slots and utilizes the links F2, F7, the service S6 requires 7 slots and utilizes the link F4, the service S7 requires 18 slots and utilizes the link F5, the service S8 utilizes 8 slots and utilizes the links F4, F7. Service S9 requires 6 slots and utilizes the links F2, F4, and the service S10 requires 8 slots and utilizes the links F1, F2, F5. Note, the tables in FIG. 5 do not list which slots are assigned on the horizontal axis as these assignments have not been completed at this stage (greenfield). For illustration in FIG. 5, each table is a single service showing how many cells it uses and which links it traverses. The numbers in each cell in each table in FIG. 5 are the service number, 1 through 10.

Figure 6:
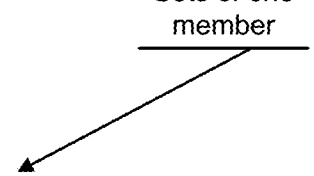
FIG. 6 is an initial table of a matrix M associated with the services in FIG. 5.

FIG. 6 is a table of a matrix M associated with the services in FIG. 5. Specifically, FIG. 6 illustrates step 51 in the spectrum assignment process 50. The matrix M has the services S1-S10 on both the rows and columns and represents all possible combinations and permutations of choosing a pair of services from the set of all services. In accordance with the proposed method, if any two service patterns can form a combined service pattern without overlapping (disjointed), their corresponding M-matrix value is 1, 0 otherwise. Of course, every service overlaps with itself. Thus the diagonal from the top left cell to the bottom right cell is 0. The cell values of 1 are where two services can form a combined service pattern without blocking one another on a link. As described herein, the combined service pattern means two services can be combined, i.e., the two services can use at least part overlapping (the same) spectrum since they do not traverse the same links.

For example, the services S1, S2 are disjoint since the four slots in S1 traverse different links from the six slots in S2. Thus, these values are 1 in the matrix M. Conversely, the services S2, S3 are not disjoint since the seven slots in S3 overlap with the six slots in S2 on link F6. The objective of the M matrix is to show a 1 value where any two services can be combined (share the same spectrum) on different links. It is apparent that only one of the top-right or bottom left-half of M need be computed. The "Fill" on the bottom row is a number of occupancies in a pattern column in the tables of FIG. 5, i.e., the number of links each service occupies from FIG. 5. For example, Fill({S1})=3 as service S1 occupies links F1, F3, F7, Fill({S2})=2 as the service S2 occupies the links F2, F6, etc. Max W represents spectral width per service from FIG. 5.

FIG. 7 is a table expanding the matrix M to form groups G based on the initial matrix M in FIG. 6. A first table 60 illustrates various groups G with two members, a second table 62 illustrates various groups G with three members, and a third table 64 illustrates groups G with four members. The tables 60, 62, 64 all show the same information, but are shown separately to fit in FIG. 7. For example, a group can be any combination of services which are disjoint based on the matrix M in FIG. 6. Example groups include {S1, S2}, {S1, S4}, {S1, S2, S4}, {S1, S2, S4, S7}, etc. Note, in the table 60, each two-member group for example in top-right corner of matrix M with other services to determine whether they are disjoint. This comparison in FIG. 7 is equivalent to the comparison in FIG. 6. For example, FIG. 6 illustrates a comparison between every service individually. In FIG. 7, the comparison in table 60 is between pairs of services to individual services. In the table 64, note the values are all 0 in the cells indicating it is not possible to form groups larger than four members.

In FIG. 7, a first group G1 is formed as {S1, S2, S4, S7}. The first group can have the largest fill and the smallest σ. The group G1 contains the maximum possible number of disjointed SNCs that produces maximum "cliques," i.e., largest spectrum width and smallest σ if there are more than one.

FIG. 8A is a table 64 of the matrix M with the group G1 formed. That is, FIG. 8 includes the table 64 and the group G1 is selected because it has the smallest σ. G1 is also listed in a table T1 in FIG. 8B which has the rows representing the links F1-F7. Specifically, after forming the group G1, the services S1, S2, S4, S7 can be removed from the matrix M (this is shown in FIG. 9 onward where the services S1, S2, S4, S7 are marked out in the tables for the matrix M). Note, the services S1, S2, S4, S7 are selected for G1 over the services S1, S2, S6, S7 based on the smallest σ as both of these have the same fill. The next objective is to find another group G2, which here is selected with service S3, S5.

Figures 9A, 9B:
FIGS. 9A and 9B are the shrunk table of the matrix M with the service members of groups G1, G2 formed in FIGS. 7, 8 are removed from any sets and group G3 is selected.

FIG. 9A is a table T2 of the matrix M with the group G2 formed. The group G2 includes services S3, S5 with a fill of 5 and σ of 0.71, i.e., the largest spectrum width (fill) and smallest σ. FIG. 9A includes table T2 which is a portion of the matrix M with the services S1, S2, S4, S7 in G1 removed (marked out) from the columns. FIG. 9B also includes a table T3 illustrating the links F1-F7 and the group G2.

FIG. 10A is a table T4 of the matrix M with the group G3 formed. The group G3 includes services S8, S10. FIG. 10A includes a table T4 which includes a portion of the matrix M with the services S1, S2, S3, S4, S5, S7 removed (marked out) (as they are in groups G1, G2). From the table T4, the group G3 is selected with the services S8, S10 based on the fill of 5 and the σ of 0 as illustrated in table T5 in FIG. 10B.

Figures 11A, 11B:
FIGS. 11A and 11B are an expanded table of the entire matrix M with the selected groups based on the services S1-S10.

FIG. 11A is a table T6 of the matrix M with the remaining services S6, S9. The remaining services S6, S9 overlap and thus the last two groups G4, G5 each have one member (as illustrated in tables T7, T8 in FIG. 11B).

After FIG. 11, the groups G1-G5 are formed and the spectrum assignment process 50 moves to step 53 with respect to the placement of the groups G1-G5. The objective of the group placement is to arrange the groups in a sequence in such an order to reduces the combined total spectrum width.

FIG. 12 is a table where each group G1-G5 is sequentially added. In this example, the five groups may be inserted in the spectrum plan as a sequence, e.g., 1, 2, 3, 4, 5. Also, it may happen that the member's pattern of any two groups slides into the other group resulting in a total group width $W_{Total} < W_{G1} W_{G2}$. Of note, the ordering of the groups matters and the objective of step 53 is to determine the optimal group ordering, which is not necessarily sequential. Further, when two groups merge, individual services may slide together so long as these services can slid on each link. For example, FIG. 13 illustrates sliding between groups G1, G2.

FIG. 13 illustrates tables of two options for combining the groups G1, G2. Of note, the merging sequence of any two groups matters. For example, the groups G1, G2 can be combined as G1+G2 or G2+G1, i.e., order matters. As shown in FIG. 13, the sequence G1+G2 has more "useless" spectrum slots than the sequence G2+G1 ("useless" spectrum slots are shown with black shading in the tables). For example, the sequence G1+G2 has four blocked slots on link F1, and two blocked slots on the links F6, F7. The sequence G2+G1 only has one blocked slot on the links F1, F6. As described herein, "useless" spectrum slots means these slots are unavailable for a new assignment. However, the "useless" spectrum may be used to expand an adjacent MC.

One aspect of group merging involves the sliding together of the groups G1, G2 (or G2, G1) where services slide together to minimize useless spectrum. For example, the merged group G1+G2 or G2+G1 no longer appear as separate groups G1 or G2. In G1+G2, the service S3 is blocked in part on link F4 causing extra useless spectrum on links F1, F2 and the service S5 is blocked in part on link F2 causing useless spectrum on link F7. By contrast, in G2+G1, the pieces fit better together leading to only two useless slots. Logically, the groups G1, G2 are geometric shapes and the objective here is to find the optimal combination of the groups, geometrically which minimizes useless spectrum.

FIG. 14 is a diagram of group placement. The group placement can include starting with the largest fill group, e.g., G1, and selecting the other right/left neighbors that produce maximum spectrum saving (i.e., minimum "useless" spectrum). This process is continued until all groups are placed. In this example, at step 1, G1 is neighbored with all other groups G2-G5 on the left and right sides. It is determined that G2+G1 provides the least amount of useless spectrum. Now, at step 2, the other groups G3-G5 are placed on the left and right sides of G2+G1. It is determined that G2+G1+G5 provides the least amount of useless spectrum. Now, at step 3, the other groups G3, G4 are placed on the left and right sides of G2+G1+G5. It is determined that G2+G1+G5+G4 provides the least amount of useless spectrum. At step 4, the remaining group G3 is placed on the left and right sides of G2+G1+G5+G4 to yield G2+G1+G5+G4+G3 at step 5.

Processing Device

Figure 15:
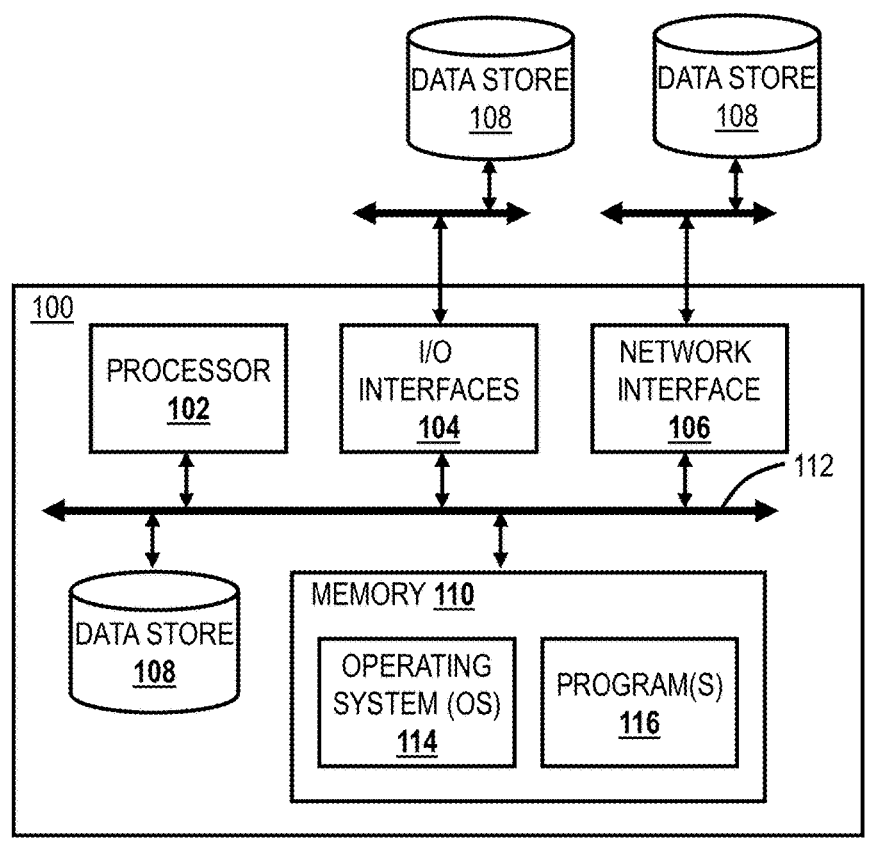
FIG. 15 is a block diagram of a processing device.

FIG. 15 is a block diagram of a processing device 100 such as for the servers 16, for a processing device to implement the control plane 18, for an SDN controller, a PCE, etc. The processing device 100 can be a digital computer that, in terms of hardware architecture, generally includes a processor 102, input/output (I/O) interfaces 104, a network interface 106, a data store 108, and memory 110. It should be appreciated by those of ordinary skill in the art that FIG. 15 depicts the processing device 100 in an oversimplified manner, and a practical embodiment may include additional components and suitably configured processing logic to support known or conventional operating features that are not described in detail herein. The components (102, 104, 106, 108, and 110) are communicatively coupled via a local interface 112. The local interface 112 can be, for example, but not limited to, one or more buses or other wired or wireless connections, as is known in the art. The local interface 112 can have additional elements, which are omitted for simplicity, such as controllers, buffers (caches), drivers, repeaters, and receivers, among many others, to enable communications. Further, the local interface 112 can include address, control, and/or data connections to enable appropriate communications among the aforementioned components.

The processor 102 is a hardware device for executing software instructions. The processor 102 can be any custom made or commercially available processor, a central processing unit (CPU), an auxiliary processor among several processors associated with the processing device 100, a semiconductor-based microprocessor (in the form of a microchip or chip set), or generally any device for executing software instructions. When the processing device 100 is in operation, the processor 102 is configured to execute software stored within the memory 110, to communicate data to and from the memory 110, communicate data to and from other devices via the network interface 106, and to generally control operations of the processing device 100 pursuant to the software instructions. The I/O interfaces 104 can be used to receive user input from and/or for providing system output to one or more devices or components.

The network interface 106 can be used to enable the processing device 100 to communicate on a network. The network interface 106 can include, for example, an Ethernet card or adapter or a wireless local area network (WLAN) card or adapter. The network interface 106 can include address, control, and/or data connections to enable appropriate communications on the network. A data store 108 can be used to store data. The data store 108 can include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 108 can incorporate electronic, magnetic, optical, and/or other types of storage media. In one example, the data store 108 can be located internal to the processing device 100 such as, for example, an internal hard drive connected to the local interface 112 in the processing device 100. Additionally, in another embodiment, the data store 108 can be located external to the processing device 100 such as, for example, an external hard drive connected to the I/O interfaces 104 (e.g., SCSI or USB connection). In a further embodiment, the data store 108 can be connected to the processing device 100 through a network, such as, for example, a network attached file server.

The memory 110 can include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 110 can incorporate electronic, magnetic, optical, and/or other types of storage media. Note that the memory 110 can have a distributed architecture, where various components are situated remotely from one another, but can be accessed by the processor 102. The software in memory 110 can include one or more software programs, each of which includes an ordered listing of executable instructions for implementing logical functions. The software in the memory 110 includes a suitable operating system (O/S) 114 and one or more programs 116. The operating system 114 essentially controls the execution of other computer programs, such as the one or more programs 116, and provides scheduling, input-output control, file and data management, memory management, and communication control and related services. The one or more programs 116 may be configured to implement the various processes, algorithms, methods, techniques, etc. described herein.

In an embodiment, the software in the memory 110 can include instructions configured to, for an optical network with a plurality of links with optical spectrum on each of the plurality of links managed utilizing a flexible grid, obtain, via the network interface, a set of S services which require spectrum assignment on various links in the optical network, partition the set of S services into a plurality of groups G, wherein each group includes one or more of the S services that are disjoint from one another based on occupancy of links of the plurality of links, and wherein the plurality of groups G are selected based on fill which is a number of links occupied of the plurality of links, standard deviation, and width of spectrum, determine a sequence of the plurality of groups that minimizes useless spectrum, the useless spectrum being slots of spectrum unavailable for new channels, and assign spectrum to the set of S services based on the plurality of groups and the determined sequence.

The flexible grid can include a plurality of slots each having a specified spacing. The sequence of the plurality of groups that minimizes useless spectrum can have a least number of slots unavailable for new channels as the plurality of groups are slid into one another. The plurality of groups G can be selected such that a first group has a largest fill and smallest standard deviation and each subsequent group can be similarly selected until all of the set of S services are in one of the plurality of groups G. The partitioning the set of S services into the plurality of groups G can utilize a matrix M which illustrates whether a particular service or group is disjoint with another particular service or group. The sequence can have two groups slid into one another such that a total group width is less than a combination of widths of the two groups. The useless spectrum are slots that are blocked based on the sliding of the two groups.

In another embodiment, a spectrum assignment process can include, for an optical network with a plurality of links with optical spectrum on each of the plurality of links managed utilizing a flexible grid, obtaining a set of S services which require spectrum assignment on various links in the optical network; partitioning the set of S services into a plurality of groups G, wherein each group includes one or more of the S services that are disjoint from one another based on occupancy of links of the plurality of links, and wherein the plurality of groups G are selected based on fill which is a number of links occupied of the plurality of links, standard deviation, and width of spectrum; determining a sequence of the plurality of groups that minimizes useless spectrum, the useless spectrum being slots of spectrum unavailable for new channels; and assigning spectrum to the set of S services based on the plurality of groups and the determined sequence.

In a further embodiment, a non-transitory computer-readable medium that includes instructions that, when executed, can cause the processing device 100 to perform the steps of the spectrum assignment process.

Accordingly, it will be appreciated that some embodiments described herein may include one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured or adapted to," "logic configured or adapted to," etc. perform a set of operations, steps, methods, processes, algorithms, functions, techniques, etc. on digital and/or analog signals as described herein for the various embodiments.

Moreover, some embodiments may include a non-transitory computer-readable storage medium having computer readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer-readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A spectrum assignment method comprising:

for an optical network comprising a plurality of links with optical spectrum on each of the plurality of links managed utilizing a flexible grid, obtaining a set of S services which require spectrum assignment on various links in the optical network;

partitioning the set of S services into a plurality of groups G, wherein each group includes one or more of the S services that are disjoint from one another based on occupancy of links of the plurality of links, and wherein the plurality of groups G are selected based on fill which is a number of links occupied of the plurality of links, standard deviation, and width of spectrum;

determining a sequence of the plurality of groups that minimizes useless spectrum, the useless spectrum being slots of spectrum unavailable for new channels; and assigning spectrum to the set of S services based on the plurality of groups and the determined sequence.

2. The spectrum assignment method of claim 1, wherein the flexible grid includes a plurality of slots each having a specified spacing.

3. The spectrum assignment method of claim 1, wherein the sequence of the plurality of groups that minimizes useless spectrum has a least number of slots unavailable for new channels as the plurality of groups are slid into one another.

4. The spectrum assignment method of claim 1, wherein the plurality of groups G are selected such that a first group has a largest fill and smallest standard deviation and each subsequent group is similarly selected until all of the set of S services are in one of the plurality of groups G.

5. The spectrum assignment method of claim 1, wherein the partitioning the set of S services into the plurality of groups G utilizes a matrix M which illustrates whether a particular service or group is disjoint with another particular service or group.

6. The spectrum assignment method of claim 1, wherein the sequence has two groups slid into one another such that a total group width is less than a combination of widths of the two groups.

7. The spectrum assignment method of claim 6, wherein the useless spectrum are slots that are blocked based on the sliding of the two groups.

8. A processing device comprising:

a network interface and a processor communicatively coupled to one another; and memory storing instructions that, when executed, cause the processor to for an optical network comprising a plurality of links with optical spectrum on each of the plurality of links managed utilizing a flexible grid, obtain, via the network interface, a set of S services which require spectrum assignment on various links in the optical network, partition the set of S services into a plurality of groups G, wherein each group includes one or more of the S services that are disjoint from one another based on occupancy of links of the plurality of links, and wherein the plurality of groups G are selected based on fill which is a number of links occupied of the plurality of links, standard deviation, and width of spectrum, determine a sequence of the plurality of groups that minimizes useless spectrum, the useless spectrum being slots of spectrum unavailable for new channels, and assign spectrum to the set of S services based on the plurality of groups and the determined sequence.

9. The processing device of claim 8, wherein the flexible grid includes a plurality of slots each having a specified spacing.

10. The processing device of claim 8, wherein the sequence of the plurality of groups that minimizes useless spectrum has a least number of slots unavailable for new channels as the plurality of groups are slid into one another.

11. The processing device of claim 8, wherein the plurality of groups G are selected such that a first group has a largest fill and smallest standard deviation and each subsequent group is similarly selected until all of the set of S services are in one of the plurality of groups G.

12. The processing device of claim 8, wherein the partitioning the set of S services into the plurality of groups G utilizes a matrix M which illustrates whether a particular service or group is disjoint with another particular service or group.

13. The processing device of claim 8, wherein the sequence has two groups slid into one another such that a total group width is less than a combination of widths of the two groups.

14. The processing device of claim 13, wherein the useless spectrum are slots that are blocked based on the sliding of the two groups.

15. A non-transitory computer-readable medium comprising instructions that, when executed, cause a processing device to perform the steps of:

for an optical network comprising a plurality of links with optical spectrum on each of the plurality of links managed utilizing a flexible grid, obtaining a set of S services which require spectrum assignment on various links in the optical network;

partitioning the set of S services into a plurality of groups G, wherein each group includes one or more of the S services that are disjoint from one another based on occupancy of links of the plurality of links, and wherein the plurality of groups G are selected based on fill which is a number of links occupied of the plurality of links, standard deviation, and width of spectrum;

determining a sequence of the plurality of groups that minimizes useless spectrum, the useless spectrum being slots of spectrum unavailable for new channels; and assigning spectrum to the set of S services based on the plurality of groups and the determined sequence.

16. The non-transitory computer-readable medium of claim 15, wherein the flexible grid includes a plurality of slots each having a specified spacing.

17. The non-transitory computer-readable medium of claim 15, wherein the sequence of the plurality of groups that minimizes useless spectrum has a least number of slots unavailable for new channels as the plurality of groups are slid into one another.

18. The non-transitory computer-readable medium of claim 15, wherein the plurality of groups G are selected such that a first group has a largest fill and smallest standard deviation and each subsequent group is similarly selected until all of the set of S services are in one of the plurality of groups G.

19. The non-transitory computer-readable medium of claim 15, wherein the partitioning the set of S services into the plurality of groups G utilizes a matrix M which illustrates whether a particular service or group is disjoint with another particular service or group.

20. The non-transitory computer-readable medium of claim 15, wherein the sequence has two groups slid into one another such that a total group width is less than a combination of widths of the two groups.

* * * * *